(12) United States Patent
Yusa et al.

(10) Patent No.: US 6,229,369 B1
(45) Date of Patent: May 8, 2001

(54) CLOCK CONTROL CIRCUIT

(75) Inventors: Atsushi Yusa; Mitsuya Ohie; Kazutoshi Inoue, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/375,807

(22) Filed: Aug. 17, 1999

(30) Foreign Application Priority Data

Aug. 17, 1998 (JP) .................................................. 10-230802

(51) Int. Cl.[7] ....................................................... G06F 1/04
(52) U.S. Cl. ................................ 327/295; 327/48; 327/117
(58) Field of Search ............................. 327/295, 48, 117, 327/403, 407, 544; 377/47

(56) References Cited

U.S. PATENT DOCUMENTS 5,666,355 * 9/1997 Huah et al. ............................ 370/311
5,774,702 * 6/1998 Mitsuishi et al. ..................... 395/556

* cited by examiner

Primary Examiner—Toan Tran
Assistant Examiner—Cassandra Cox
(74) Attorney, Agent, or Firm—Venable; Robert J. Frank; Jeffrey W. Gluck

(57) ABSTRACT

In a clock control circuit there are provided a counter for dividing a reference clock signal so as to generate a plurality of divided clock signals and selectors for selectively outputting one of the plurality of divided clock signals and the reference clock signal as an operation clock signal relative to a CPU or as an operation clock signal relative to a peripheral circuit.

10 Claims, 4 Drawing Sheets

CLOCK CONTROL CIRCUIT

BACKGROUND OF THE INVENTION

1. Field of the Invention

The invention relates to a clock control circuit for generating operation clock signals, particularly, to a clock control circuit comprising semiconductor integrated circuits.

2. Description of the Related Art

A semiconductor integrated circuit such as a microcomputer incorporates therein a central processing unit (hereinafter referred to as CPU), an internal circuit as a peripheral circuit of the CPU (hereinafter referred to as a peripheral circuit or as an internal circuit), such as a memory, a timer circuit, an interface circuit or the like. The CPU and the peripheral circuit respectively perform intended functions in response to operation clock signals, each having a given clock period rate which is determined by a frequency.

The need for low power consumption of a semiconductor integrated circuit has recently increased. There is a proposal for supplying operation clock signals having a given clock period determined in response to operation conditions to a CPU or a peripheral circuit as one of the methods of realizing low power consumption.

That is, as for a host unit using a semiconductor integrated circuit, in a state where the semiconductor integrated circuit does not require a processing operation such as a latency, namely, at the time until an instruction for instructing new processing is issued, and the like, the semiconductor integrated circuit is operated in response to operation clock signals of low frequency. In a state where processing is needed in a semiconductor integrated circuit, the semiconductor integrated circuit is operated in response to operation clock signals of a high frequency, which is higher than the operation clock signals of a low frequency. When the semiconductor integrated circuit is operated at low speed in response to the operation clock signals of low frequency, power consumption generated in the semiconductor integrated circuit is reduced by the reduction of the number of operations. Accordingly, it is possible to reduce the waste power consumption in the semiconductor integrated circuit. The control of the operation clock signals is generally performed by software.

The control of operation clock signals set forth above is particularly effective for portable equipment employing a battery which has been recently developed in practical use.

As a peripheral circuit, there are a timer circuit for counting time as mentioned above, an interface circuit for sending and receiving data while communicating with external equipment, and the like. When the peripheral circuit is operated in response to operation clock signals of low frequency for realizing low power consumption, the peripheral circuit incurs delays in operating speed. As a result, for example, a timer circuit normally can not count time. Further, the interface circuit normally cannot send and receive data because of nonconformity with a transmission speed relative to external equipment of the other communication party. If such a drawback is caused by software, the control thereof becomes complex.

Further, as for a frequency adapted for operation clock signals of low frequency in order to efficiently realize low power consumption it is preferable for, the operation clock signals to have an optimum frequency even in the case of operation of the CPU and internal circuit at low speed.

It is an object of the invention to provide a clock control circuit capable of realizing low power consumption without impairing functions of respective circuits constituting a semiconductor integrated circuit.

It is another object of the invention to provide a clock control circuit capable of supplying operation clock signals having an optimum frequency even in the case of operation of a CPU or internal circuit at low speed.

SUMMARY OF THE INVENTION

To solve the above-mentioned problems, the invention comprises a clock control circuit for supplying operation clock signals, each having a given period, to a central processing unit and an internal circuit comprising a divider for generating a divided clock signal which is obtained by dividing a reference clock signal, a first selector for selectively outputting the reference clock signal and the divided clock signal as the operation clock signal relative to the central processing unit, and a second selector for selectively outputting the reference clock signal and the divided clock signal as the operation clock signal relative to the internal circuit.

Further, the clock control circuit of the invention may be structured so that the divider generates a plurality of divided clock signals having different frequencies, and the first and second selectors output either the reference clock signal or one of the plurality of divided clock signals as the operation clock signals.

Further, the clock control circuit of the invention may be structured so that the divider comprises a first subdivider for generating the divided clock signal to be inputted to the first selector and a second subdivider for generating a divided clock signal to be inputted to the second selector.

Further, the clock control circuit of the invention may be structured so that the first subdivider comprises a first counter and includes a first setting circuit for setting an initial-value to the first counter in response to overflow of the first counter, and the second subdivider comprises a second counter and includes a second setting circuit for setting an initial-value to the second counter in response to overflow of the second counter.

Further, the clock control circuit of the invention may comprise a control circuit for controlling switching of outputs of the first and second selectors.

Further, the clock control circuit of the invention may be structured so that switching of the output relative to the first selector is controlled in response to a signal outputted from the internal circuit.

Further, the clock control circuit of the invention may be structured so that the divider comprises counters, and includes setting circuits for setting an initial-value to the counters in response to overflow of the counter.

BRIEF DESCRIPTIONS OF THE DRAWINGS

DETAILED DESCRIPTION OF THE PREFERRED EMBODIMENTS

Figure 1:
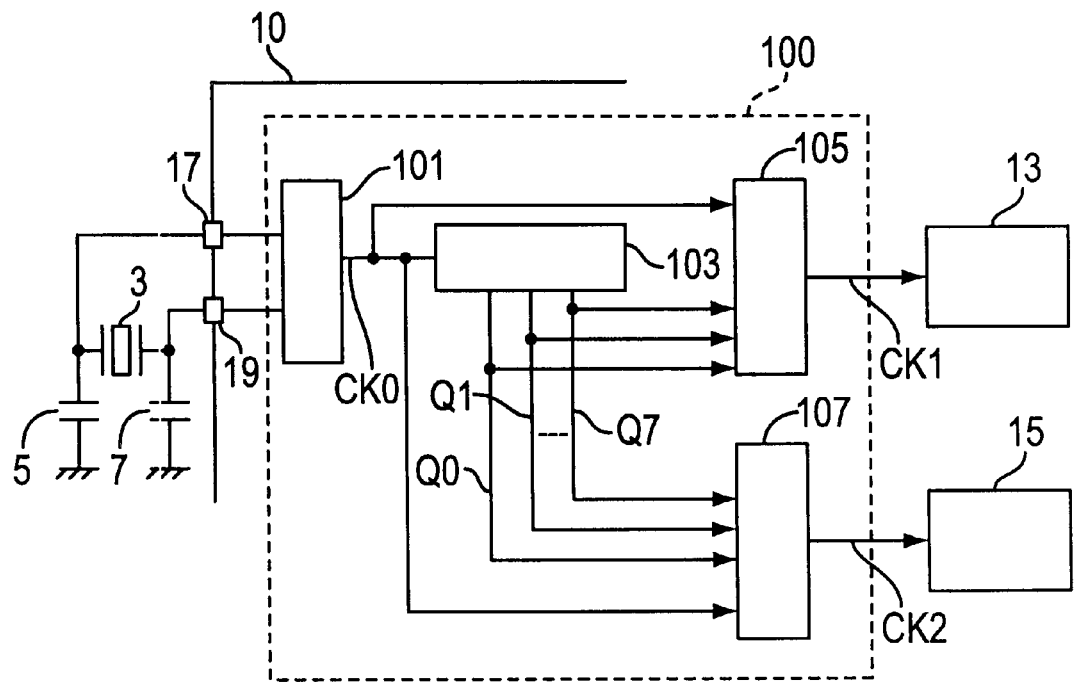
FIG. 1 is a block diagram of a clock control circuit 100 according to a first embodiment of the invention.

A clock control circuit according to the invention is now described with reference to the attached drawings. FIG. 1 is a block diagram of a clock control circuit 100 according to a first embodiment of the invention. Suppose that the clock control circuit 100 is built in a microcomputer 10.

The clock control circuit 100 comprises an oscillation circuit 101, a counter 103 as a divider, a selector 105 as a first selector, and a selector 107 as a second selector. The oscillation circuit 101 may be provided outside the clock control circuit 100.

The oscillation circuit 101 is connected to external connection terminals 17, 19 provided in the microcomputer 10. The external connection terminals 17, 19 are connected to an oscillation source comprising a crystal oscillator 3, and capacitors 5, 7. The oscillation circuit 101 generates and outputs a reference clock signal CK0 having a given frequency which is waveform shaped on the basis of the operation of the oscillation source.

The counter 103 receives the reference clock signal CK0. The counter 103 generates and outputs a plurality of divided clock signals which are different from the reference clock signal CK0 in a clock period (namely, the frequencies of the former are different from the frequency of the latter) on the basis of the reference clock signal CK0 received. The counter 103 in FIG. 1 is exemplified for outputting eight divided clock signals Q0 to Q7.

Figure 2:
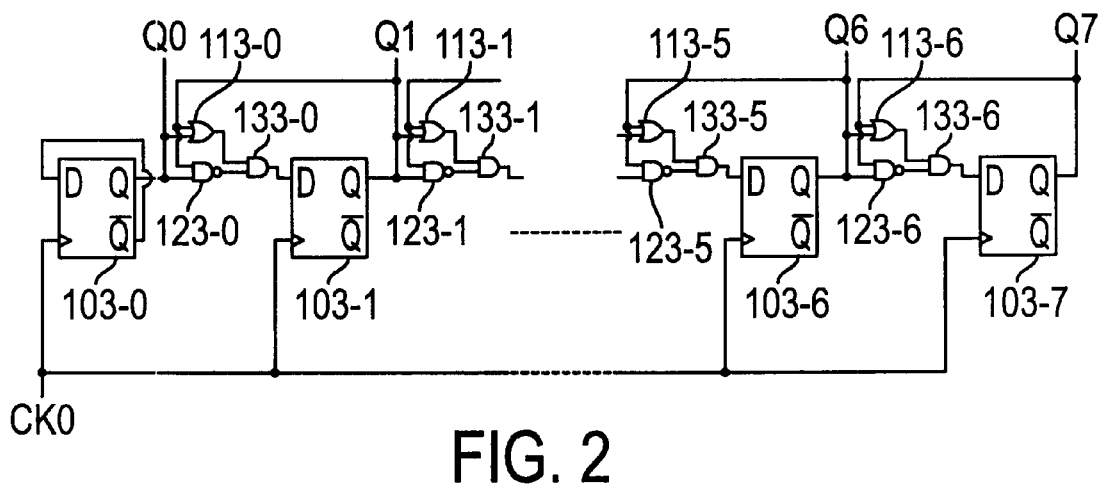
FIG. 2 is a circuit diagram of a counter 103 in FIG. 1.

A concrete circuit diagram of the counter 103 is illustrated in FIG. 2.

Since the clock control circuit 100 in FIG. 1 generates eight divided clock signals Q0 to Q7, it comprises eight D type flip-flops 103-0 to 103-7, seven OR gates 113-0 to 113-6, seven NAND gates 123-0 to 123-6, and seven AND gates 133-0 to 133-6.

The reference clock signal CK0 is inputted to a clock terminal of the flip-flop (hereinafter referred to FF) 103-0. An output terminal Q of the FF103-0 is connected to one input terminal of the NAND gate 123-0. An inverted output terminal $\overline{Q}$ of the FF103-0, which outputs a signal having a voltage level complementary to a signal outputted from the output terminal Q, is connected to an input terminal D of the FF103-0. A signal outputted from the output terminal Q of the FF103-0 becomes a divided clock signal Q0.

An output terminal Q of the FF103-1 in the next stage is connected to one input terminal of the OR gate 113-0 and the other input terminal of the NAND gate 123-0. The other input terminal of the OR gate 113-0 is connected to the output terminal Q of the FF103-0. The output terminal of the OR gate 113-0 and that of the NAND gate 123-0 are respectively connected to one of two input terminals of the AND gate 133-0. An output terminal of the AND gate 133-0 is connected to an input terminal D of the FFs in the next stage.

The reference clock signal CK0 is inputted to a clock terminal of the FF103-1. An output terminal Q of the FF103-1 is connected to one input terminal of the NAND gate 123-1. An inverted output terminal $\overline{Q}$ of the FF103-1 is not used in the first embodiment of the invention. A signal outputted from the output terminal Q of the FF103-1 becomes a divided clock signal Q1.

The output terminal Q of the FF103-2 in the next stage is connected to one input terminal of the OR gate 113-1 and the other input terminal of the NAND gate 123-1. The other input terminal of the OR gate 113-1 is connected to the output terminal Q of the FF103-1. The output terminal of the OR gate 113-1 and that of the NAND gate 123-1 are respectively connected to one of two input terminals of the AND gate 133-1. An output terminal of the AND gate 133-1 is connected to an input terminal D of the FF103-2 in the next stage.

Likewise, in the same manner as mentioned above, the reference clock signal CK0 is inputted to a clock terminal of an FF 103-K (integer of $2 \leq K \leq 6$). An output terminal Q of the FF 103-K is connected to one input terminals of a NAND gate 123-K An inverted output terminal $\overline{Q}$ of the FF 103-K is not used in the first embodiment of the invention. A signal outputted from the output terminal Q of the FF 103-K becomes a divided clock signal QK.

An output terminal Q of the FF103-(K+1) in the next stage is connected to one input terminal of an OR gate 113-K and the other input terminal of the NAND gate 123-K. The other input terminal of the OR gate 113-K is connected to the output terminal Q of the FF 103-K The output terminal of the OR gate 113-K and that of the NAND gate 123-K are respectively connected to one of two input terminals of AND gate 133-K An output terminal of the AND gate 133-K is connected to an input terminal D of the FF 103-(K+1) in the next stage.

The reference clock signal CK0 is inputted to a clock terminal of an FF 103-7. An inverted output terminal $\overline{Q}$ of the FF 103-7 is not used in the first embodiment of the invention. A signal outputted from an output terminal Q of the FF 103-7 becomes a divided clock Q7.

Hereupon, the operation of a logic circuit comprising the OR gate 113-0, the NAND gate 123-0, and the AND gate 133-0 is now described.

When the voltage level of a signal outputted from the output terminal Q of the FF103-0 is L (ground voltage VSS) level, the voltage level of a signal outputted from the NAND gate 123-0 is fixed to H (power supply voltage VDD) level while the voltage level of a signal outputted from the OR gate 113-0 becomes a voltage level corresponding to the voltage level of a signal outputted from the output terminal Q of the FF103-1. Accordingly, the voltage level of a signal outputted from the AND gate 133-0 becomes a voltage level corresponding to a voltage level of the output signal of the OR gate 113-0. The ground voltage VSS is, e.g., 0V, while the power supply voltage VDD is, e.g., 5V.

That is, when the voltage level of the signal outputted from the output terminal Q of the FF103-1 is L level, the voltage level of the output signal of the AND gate 133-0 also becomes L level. When the voltage level of the signal outputted from the output terminal Q of the FF103-1 is H level the voltage level of the output signal of the AND gate 133-0 also becomes H level.

Next, when the voltage level of the signal outputted from the output terminal Q of the FF103-0 is H level, the voltage level of the output signal of the NAND gate 123-0 becomes a voltage level complementary to the voltage level of the signal outputted from the output terminal Q of the FF103-1. The voltage level of the output signal of the OR gate 113-0 is fixed to H level. Accordingly, the voltage level of the signal outputted from the AND gate 133-0 becomes a voltage level corresponding to the voltage level of the output signal of the NAND gate 123-0.

That is, when the voltage level of the signal outputted from the output terminal Q of the FF103-1 is L levels the voltage level of the output signal of the AND gate 133-0 becomes H level. When the voltage level of the signal outputted from the output terminal Q of the FF103-1 is H levels the voltage level of the output signal of the AND gate 133-0 becomes L level.

Similarly, when the voltage level of a signal outputted from an output terminal Q of an FF 103-g (integer of $1 \leq g \leq 6$) is L level and the voltage level of a signal outputted from the output terminal Q of an FF 103-(g+1) is L level, the voltage level of a signal outputted from an AND gate 133-g also becomes L level. When the voltage level of a signal outputted from the output terminal Q of an FF 103-(g+1) is H level, the voltage level of a signal outputted from the AND gates 133-g also becomes H level.

Also, when the voltage level of the signal outputted from the output terminal Q of the FF 103-g is H level, and the voltage level of the signal outputted from the output terminals Q of the FF 103-(g+1) is L level, the voltage level of the signal outputted from the AND gate 133-g becomes H level. When the voltage level of the signal outputted from the output terminal Q of the FF 103-(g+1) is H level, the voltage level of the signal outputted from the AND gate 133-g becomes L level.

A plurality of FFs 103-0 to 103-7 operate in response to rising of the reference clock signal CK0 (when the voltage level is changed from L level to H level). The operation of the counter 103 shown in FIG. 2 is next described. Suppose that all the voltage levels of the divided clock signals Q0 to Q7 of the counter 103 are L levels in the initial state. That is, a signal of H level is inputted to the input terminals D of the FF103-0, while signals of L level (signals outputted from AND gates 133-0 to 133-6) are inputted to the input terminal D of the FFs 103-1 to 103-7.

Since the signal of H level in voltage level is inputted to the input terminal D of the FF103-0 in response to the first rising of the reference clock signal CK0, the voltage level of the output terminal Q becomes H level. Accompanied by the change of voltage level, the voltage level of the inverted output terminal $\overline{Q}$ becomes L level.

The voltage levels of one input terminal of the OR gate 113-0 and that of one input terminal of the NAND gate 123-0 respectively become H level in response to the rising to H level of the voltage level of the output terminal Q of the FF103-0. However, since a signal of L level in voltage level is inputted to the other input terminal of the NAND gate 123-0, the voltage level of the signal outputted from the NAND gate 123-0 remains H level. Accordingly, the voltage level of the output signal of the AND gate 133-0 becomes H level.

The voltage levels of the output signals of the AND gates 133-1 to 133-6 and those of the output terminals Q of the FFs 103-1 to 103-7 remain L level.

Since the signal of L level in voltage level is inputted to the input terminal D of the FF103-0 in response to the second rising of the reference clock signal CK0, the voltage level of the output terminal Q becomes L level. Accompanied by the change of the voltage level, the voltage level of the inverted output terminal $\overline{Q}$ becomes H level. Since the signal of H level in voltage level is inputted to the input terminal D of the FF103-1, the voltage level of the output terminal Q of the FF 103-1 becomes H level in response to the second rising of the reference clock signal CK0 before the output level of the output terminal Q becomes L level.

Accompanied by the change of the voltage level, the voltage level of the output terminal Q of the FF 103-1, the voltage level of the output signal of the 133-1 becomes H level. Meanwhile, since the voltage level of the signal outputted from the output terminal Q of the FF103-0 becomes L level, the voltage level of the output signal of the AND gate 133-0 remains H level.

Since the signal of H level in voltage level is inputted to the input terminal D of the FF103-0 in response to the third rising of the reference clock signal CK0, the voltage level of the output terminal Q becomes H level. Accompanied by the change of the voltage level, the voltage level of the inverted output terminal $\overline{Q}$ becomes L level. Since a signal of H level is inputted to the input terminal D of the FF 103-1, the voltage level of the output terminal Q remains H level. Since the signal of H level in voltage level is inputted to the input terminal D of the FF 103-2 in response to the third rising of the reference clock signal CK0, the voltage level of the output terminal Q of the FF 103-2 becomes H level.

Accompanied by the change of voltage level of the output terminal Q of the FF 103-2, the voltage level of the output signal of the AND gate 133-2 becomes H level. Meanwhile, since the voltage level of the signal outputted from the output terminal Q of the FF 103-0 becomes H level, and the voltage level of the signal outputted from the output terminal Q of the FF103-1 is H level, the voltage level of the output signal of the AND gate 133-0 becomes L level, and the voltage level of the output signal of the AND gate 133-1 is H level.

Since a signal of L level in voltage level is inputted to the input terminal D of the FF 103-0 in response to the fourth rising of the reference clock signal CK0, the output level of the output terminal Q becomes L level. Accompanied by the change of the voltage level, the voltage level of the inverted output terminal $\overline{Q}$ becomes H level. Since a signal of L level in voltage level is inputted to the input terminal D of the FF 103-1, the voltage level of the output terminal Q becomes L level. Since a signal of H level in voltage level is inputted to the input terminal D of the FF 103-2, the voltage level of the output terminal Q becomes H level. Since a signal of H level in voltage level is inputted to the input terminal D of the FF 103-3, the voltage level of the output terminal Q becomes H level.

Accompanied by the change of voltage levels of the signal from output terminals Q of the FFs, the voltage level of the output signal of the AND gate 133-0 becomes L level, the voltage level of the output signal of the AND gate 133-1 becomes H level, and the voltage level of the output signal of the AND gate 133-2 becomes H level.

Subsequently, the output signal Q0 from the output terminal Q of the FF103-0 generates a clock signal having one period (clock pulse corresponding to ½ frequency of the reference clock signal CK0) relative to two clock pulses of the reference clock signal CK0 in response to the rising of the reference clock signal CK0. Further, the voltage level of the output signal Q1 of the FF 103-1 corresponds to the voltage level of the AND gate 133-0. Accordingly, the output signal Q1 of the FF 103-1 generates a clock pulse having one period (clock pulse corresponding to ¼ frequency of the reference clock signal CK0) relative to four clock pulses of the reference clock signal CK0.

Likewise, an output signal Qt of an FF 103-t (positive integer of $2 \leq t \leq 7$) generates a clock pulse having one period (clock pulse corresponding to $½^{(t+1)}$ frequency of the reference clock signal CK0) relative to $2^{(t+1)}$ clock pulses of the reference clock signal CK0.

As mentioned above, the counter 103 generates and outputs a plurality of the divided clock signals Q0–Q7 which are obtained by dividing the reference clock signal CK0. According to the first embodiment, the counter 103 comprises eight FFs and generates eight divided clock signals, but it is not limited thereto. For example, if the counter 103 comprises nine or more FFs, it can generate nine or more divided clock signals. If the counter 103 comprises seven or fewer FFs, it can generate seven or fewer divided clock signals.

The selector 105 serving as a first selector receives the reference clock signal CK0 and the divided clock signals Q0–Q7 which are outputs of the counter 103. The selector 105 selectively outputs one of these clock signals. The clock signal selectively outputted by the selector 105 becomes an operation clock signal CK1 relative to the CPU 13 built in the microcomputer 10.

The selection of a clock signal by the selector 105 is controlled, for example, by an instruction or a signal for recognizing or instructing the operation condition of the CPU 13. If high speed operation is needed by the CPU 13, the reference clock signal CK0 is selected as the operation clock signal CK1. If the CPU 13 is in an operable state at low speed, an appropriate signal among the divided clock signals Q0–Q7 is selected as the operation clock signal CK1. The selection of the divided clock signals Q0–Q7 is performed by dividing a signal for controlling the selection of the selector 105 for every divided clock signals Q0–Q7. That is, as a signal for controlling the selection of the selector 105, nine signals are needed. The operation clock signal CK1 of the selector 105 may be selected by 4-bit or more bit control data.

The selection of a clock signal by the selector 107 is controlled, for example, by a signal for recognizing or instructing the operation condition of the peripheral circuit 15. If high speed is needed in the peripheral circuit 15, the reference clock signal CK0 is selected as an operation clock signal CK2. If the peripheral circuit 15 is in an operable condition at low speed, an appropriate signal among the divided clock signals Q0–Q7 is selected as the operation clock signal CK2. The selection of the divided clock signals Q0–Q7 is performed by dividing a signal for controlling the selection of the selector 107 for every divided clock signals Q0–Q7. That is, as a signal for controlling the selection of the selector 107, nine signals are needed. The operation clock signal CK1 of the selector 107 may be selected by 4 bit or more control data.

Since the selector 105 and the selector 107 perform the same operations, the circuit configurations of these selectors may be the same. A control signal for controlling the selection of the selector 105 and a signal for controlling the selection of the selector 107 may be the same if the CPU 13 and peripheral circuit 15 operate at the same speed, while these control signals may be used separately if the CPU 13 and the peripheral circuit 15 operate at different speeds. In such a manner, the wiring in the clock control circuit can be reduced, and the control of the clock circuit can be easily performed.

The clock control circuit 100 having the construction as set forth above operates as follows. In an initial state where the microcomputer 10 starts its operation, both the selectors 105 and 107 select the reference clock signal CK0. Accordingly, both the CPU 13 and peripheral circuit 15 have the operation clock signals CK1 and CK2 which become clock pulses having the same period as the reference clock signal CK0.

Thereafter, the selector 105 selects either the reference clock signal CK0 or one of the divided clock signals Q0–Q7 as the clock signal having a period needed in response to the control signal in accordance with the operation state of the CPU 13. The selector 105 outputs the selected clock signal to the CPU 13 as the operation clock signal CK1.

Likewise, the selector 107 selects either the reference clock signal CK0 or one of the divided clock signals Q0–Q7 as the clock signal having a period needed in response to the control signal in accordance with the operation state of the peripheral circuit 15. The selector 107 outputs the selected clock signal to the peripheral circuit 15 as the operation clock signal CK2.

As mentioned above, the clock control circuit 100 according to the first embodiment can separately set and supply frequencies of the operation clock signal CK1 and operation clock signal CK2 relative to the CPU 13 and the peripheral circuit 15, and can supply these frequencies to the CPU 13 and the peripheral circuit 15. Accordingly, even in the case of realizing low power consumption by reducing the operation speed of the CPU 13, it is possible to cope with this case without reducing the operation speed of the peripheral circuit, such as a timer circuit or an interface circuit. Accordingly, it is possible to realize the low power consumption by the clock control circuit 100 of the invention without impairing the functions of respective circuits constituting a semiconductor integrated circuit, such as a microcomputer, to which the clock control circuit 100 is applied.

The selection of the operation clock signals by the clock control circuit 100 can be easily changed by a control signal. The supply of the control signal may be performed by hardware or software. If the supply of the control signal is performed by software, it is possible to arbitrarily set the relation between the operation clock signal which can be selectively outputted by the clock control circuit 100 and the control signal. If the supply of the control signal is performed by hardware, wiring through which a necessary control signal is transferred may be connected to the clock control circuit 100. Accordingly, it is not necessary to add circuit configurations for transferring a control signal.

Figure 3:
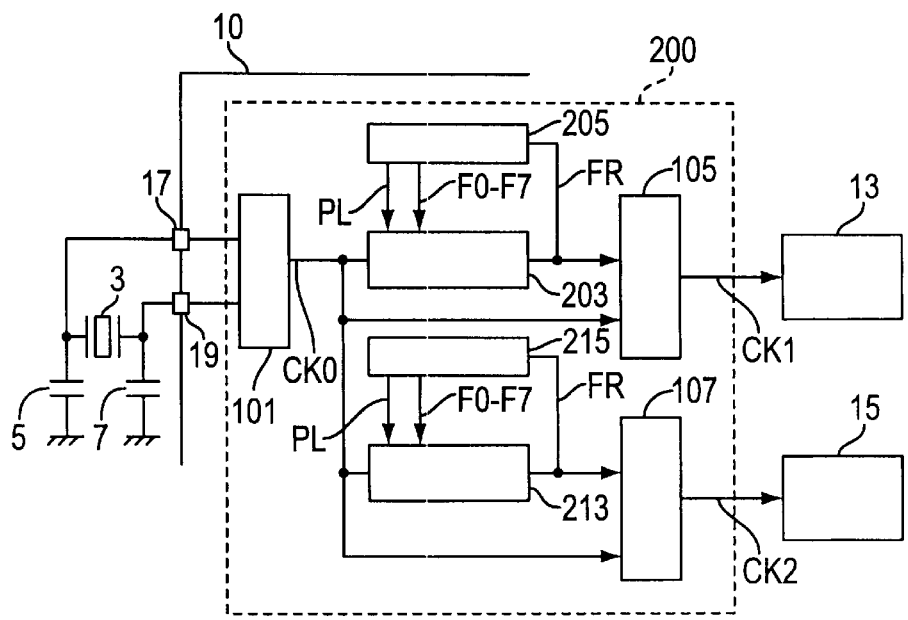
FIG. 3 is a block diagram of a clock control circuit 200 according to a second embodiment of the invention.

A clock control circuit according to a second embodiment is next described with reference to the attached drawing. FIG. 3 is a block diagram showing a clock control circuit 200 according to the second embodiment of the invention. In FIG. 3, components which are the same as those in FIG. 1 are depicted by the same reference numerals, and the explanation thereof is omitted to avoid the overlapping explanation.

In FIG. 3, the clock control circuit 200 includes two counters 203, 213 instead of the counter 103 in the first embodiment. Further, the clock control circuit 200 includes a register 205 as a first setting circuit and a register 215 as a second setting circuit setting. Accordingly, in the clock control circuit 200, an output signal FR of the counter 203 and a reference clock signal CK0 are inputted to the selector 105 while an output signal FR of the counter 213 and the reference clock signal CK0 are inputted to the selector 107. That is, the selector 105 outputs either the output signal FR of the counter 203 or the reference clock signal CK0 to the CPU 13 as an operation clock signal CK1. The selector 107 outputs either the output signal FR of the counter 213 or the reference clock signal CK0 to the peripheral circuit 15 as an operation clock signal CK2.

Figure 4:
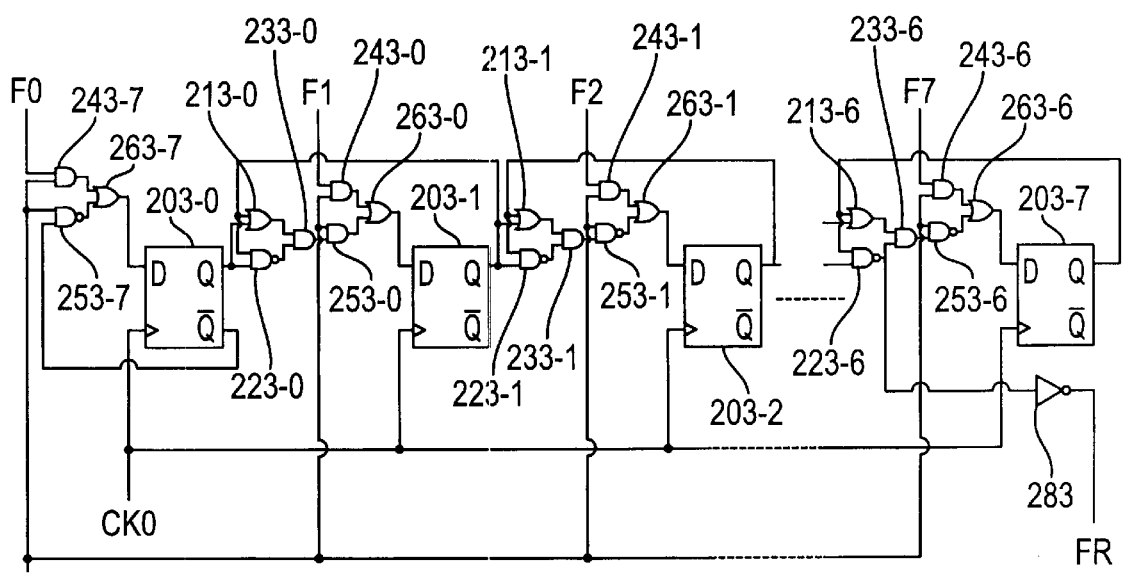
FIG. 4 is a circuit diagram of a counter 203 in FIG. 3.

Hereupon, counter 203 and counter 213 are concretely described next. FIG. 4 is a circuit diagram of the counter 203. The counter 213 may have the same circuit as the counter 203 shown in FIG. 4. Here, the counter 203 is typically described.

The counter 203 includes, in addition to the counter 103 shown in FIG. 2, eight AND gates 243-0 to 243-7, eight AND gates 253-0 to 253-7 each having an inverter at one of its input terminals, eight OR gates 263-0 to 263-7 and an inverter 283. FFs 203-0 to 203-7 in FIG. 4 correspond to FFs 103-0 to 103-7 in FIG. 2; the OR gates 213-0 to 213-6 in FIG. 4 correspond to the OR gates 113-0 to 113-6 in FIG. 2; NAND gates 223-0 to 223-6 in FIG. 4 correspond to the NAND gates 123-0 to 123-6 in FIG. 2, and AND gates 233-0 to 233-6 in FIG. 4 correspond to the AND gates 133-0 to 133-6 in FIG. 2.

A bit F0 as one output of the register 205, described later, is inputted to one input terminal of the AND gate 243-7, and an output signal PL of the register 205 is inputted to the other input terminal thereof. A signal which is obtained by inverting, a voltage level of the output signal PL of the register 205 is inputted to one input terminal of the AND gate 253-7 by way of an inverter while a signal outputted from the inverted output terminal $\overline{Q}$ of the FF 203-0 is inputted to the other input terminal thereof Output terminals of the AND gate 243-7 and AND gate 253-7 are respectively connected one of two input terminals of the OR gate 263-7.

The output terminal of the OR gate 263-7 is connected to an input terminal D of the FF 203-0.

A bit F1 as one output of the register 205 is inputted to one input terminal of the AND gate 243-0, and the output signal PL of the register 205 is inputted to the other input terminal thereof. A signal which is obtained by inverting a voltage level of the output signal PL of the register 205 is inputted to one input terminal of the AND gate 253-0 by an inverter, while the output terminal of the AND gate 233-0 is connected to the other input terminal thereof. Output terminals of the AND gate 243-0 and AND gate 253-0 are respectively connected one of two input terminals of the OR gate 263-0. The output terminal of the OR gate 263-0 is connected to an input terminal D of the FF 203-1.

Likewise, a bit F (g+1) as one of outputs of the register 205 is inputted to one input terminal of an AND gate 243-g, and the output signal PL of the register 205 is inputted to the other input terminal thereof. A signal which is obtained by inverting a voltage level of the output signal PL of the register 205 is inputted to one input terminal of the AND gate 253-g by an inverter, while the output terminal of the AND gate 233-g is connected to the other input terminal thereof Output terminals of the AND gate 243-g and the AND gate 253-g are respectively connected one of two input terminals of the OR gate 263-g. The output terminal of the OR gate 263-g is connected to an input terminal D of the FF 203-(g+1).

The output signal of the counter 203 in FIG. 4 becomes an output signal FR which is outputted from the AND gate 223-6 by way of the inverter 283. That is, although the counter 103 in FIG. 2 has eight output signals Q0–Q7, the counter 203 in FIG. 4 has only one output signal FR.

The connections among the FFs 203-0 to 203-7, the OR gates 213-0 to 213-6, the NAND gates 223-0 to 223-6 and the AND gates 233-0 to 233-6 as shown in FIG. 4 are the same as those in FIG. 2, namely, the connections among the FFs 103-0 to 103-7, the OR gates 113-0 to 113-6, the NAND gates 123-0 to 123-6 and the AND gates 133-0 to 133-6 as shown in FIG. 2, except that the inverted output terminal $\overline{Q}$ of the FF 203-0 is not directly connected to an input terminal D of the FF 203-0, but respective input terminals D of the FFs 203-0 to 203-7 are connected to the output terminals of the OR gate 263-7, OR gates 263-0 to 263-6.

Hereupon, the operation of a logic circuit comprising the AND gate 243-7, the AND gate 253-7, and the OR gate 263-7 is now described.

When the voltage level of the output signal PL is L level, the voltage level of the output signal of the AND gate 243-7 is fixed to L level regardless of the voltage level of the bit F0, while the voltage level of the output signal of the AND gate 253-7 responds to the voltage level of a signal outputted from inverted output terminal $\overline{Q}$ of the FF 203-0.

That is, when the voltage level of the inverted output terminal $\overline{Q}$ of the FFs 203-0 is L level, the voltage level of the output signal of the AND gate 253-7 becomes L level. Accordingly, the voltage level of the output signal of the OR gate 263-7 also becomes L level. When the voltage level of the inverted output terminal $\overline{Q}$ of the FF 203-0 is H level, the voltage level of the output signal of the AND gate 253-7 becomes H level. As a result, the voltage level of the output signal of the OR gate 263-7 also becomes H level.

When the voltage level of the output signal PL is L level, the voltage level of the output signal of the AND gate 253-7 is fixed to L level regardless of the voltage level of the inverted output terminal $\overline{Q}$ of the FF 203-0, while the voltage level of the output signal of the AND gate 243-7 responds to the voltage level of the bit F0. That is, when the voltage level of the bit F0 is L level, the voltage level of the output signal of the AND gate 243-7 becomes L level. Accordingly, the voltage level of the output signal of the OR gate 263-7 also becomes L level. When the voltage level of the bit F0 is H level, the voltage level of the output level of the AND gate 253-7 becomes H level. As a result, the voltage level of the output signal of the OR gate 263-7 also becomes H level.

That is, a signal having a voltage level corresponding to either the bit F0 or the signal outputted from the inverted output terminal $\overline{Q}$ becomes an output signal of the OR gate 263-7 in response to the voltage level of the output signal PL.

Likewise, in a logic circuit comprising an AND gate 243-m (integer of $0 \leq m \leq 6$), an AND gate 263-m, and a OR gate 253-m, a signal having a voltage level corresponding to either a bit F (m+1) or an output signal of an AND gate 233-m becomes an output signal of the OR gate 263-m in response to the voltage level of the output signal PL.

That is, when the voltage level of the output signal PL is L level, the i counter 203 performs the same operation as the counter 103. When the voltage level of the output signal PL is H level, the counter 203 can store information of bits F0–F7 in the FFs 203-0 to 203-7.

In the counter 203, the output signal FR is based on the output signal of the NAND gate 223-6. Accordingly, it is understood that the counter 203 operates as a first subdivider for outputting a divided clock signal having a $\frac{1}{2}^7$ frequency relative to the frequency of the reference clock signal CK0 as the output signal FR.

The counter 213 also has the same circuit configuration as the counter 203. Accordingly, it is understood that when the voltage level of the output signal PL is L level, the counter 213 outputs a divided clock signal having $\frac{1}{2}^7$ frequency relative to the reference clock signal CK0 as the output signal FR.

Figure 5:
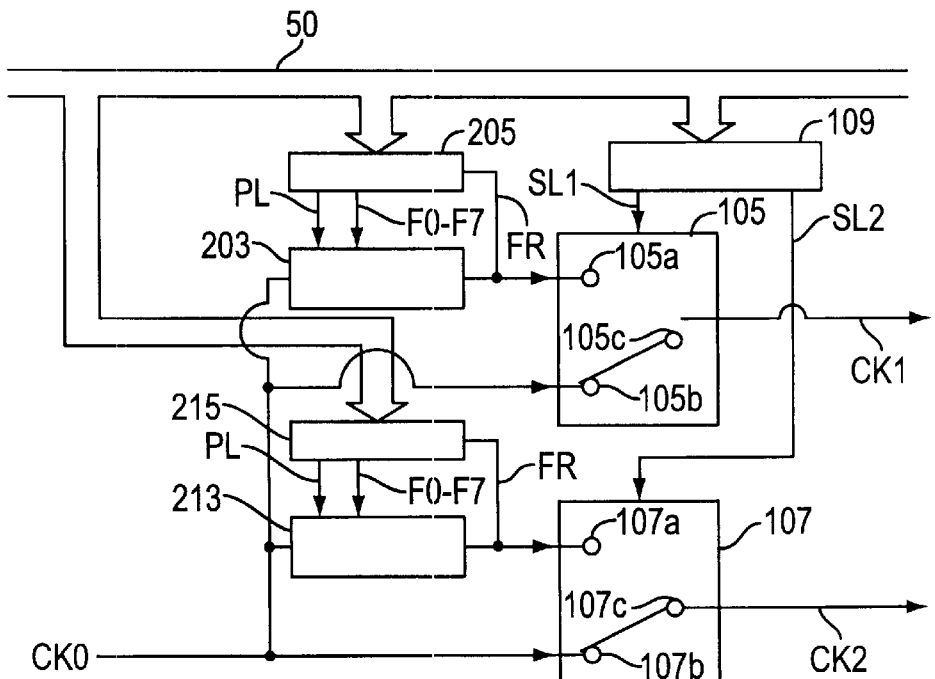
FIG. 5 is a partially enlarged view of the clock control circuit 200 in FIG. 3.

Next, the register 205 and the register 215 are described. The register 205 and register 215 perform the same operation. Here, the register 205 is described. FIG. 5 shows a partially enlarged view of the clock control circuit 200.

The register 205 can store therein given data transferred by a data bus 50. When the voltage level of the output signal PL of the register 205 is H level, data stored in the register 205 is stored in the counter 203 in response to the rising of the reference clock signal CK0. The voltage level of the output signal PL of the register 205 becomes H level when the counter 203 is in overflow state. The state where the counter 203 overflows corresponds to the time when the voltage level of the output signal FR of the counter 203 falls (voltage level is changed from H level to L level)

In other words, data F0 to F7 stored in the register 205 become initial values at the counting process by the counter 203, wherein the output signal PL is a latch signal for storing the initial values in the counter 203.

The register 215 operates like the register 205. Accordingly, the register 215 stores respective bits of the data F0–F7 stored in the register 215 in the counter 213 in response to the falling of the output signal FR of the counter 213.

For example, suppose that data set in the register 205 is 01100011B (B represents that the eight numerals depicted prior thereto are in binary notation). "99" (=01100011B) is set as an initial value of the counter 203. That is, the voltage levels of signals outputted from the output terminals Q of the FFs 203-0, 203-1, 203-5, and 203-6 become H level and the voltage levels of signals outputted from output terminals Q of the other FFs become L level.

The counter 203 starts the counting operation from the aforementioned state. Accordingly, the frequency of the output signal FR of the counter 203 serving as a divided clock signal can be arbitrarily set in accordance with the data F0 to F7 stored in the register 205.

Likewise, the frequency of the clock signal of the output signal FR of the counter 213 can be set arbitrarily in accordance with the data F0 to F7 stored in the register 215.

Both the selectors 105 and 107 in the second embodiment select either of two signals. Accordingly, as shown in FIG. 5, the selector 105 receives the divided clock signal FR which is the output signal of the counter 203 at its terminal 105a and receives the reference clock signal CK0 at its terminal 105b. The selector 105 connects either the terminal 105a or the terminal 105b to a terminal 105c in response to a control signal SL1. The selector 105 outputs a signal to be transmitted to the terminal 105c as the operation clock signal CK1.

Likewise, the selector 107 receives the divided clock signal FR which is the output signal of the counter 213 at its terminal 107a and receives the reference clock signal CK0 at its terminal 107b. The selector 107 connects the terminal 107a or the terminal 107b to a terminal 107c in response to a control signal SL2. The selector 107 outputs a signal to be transmitted to the terminal 107c as the operation clock signal CK2.

The control signals SL1 and SL2 are outputted from a register 109 serving as a control circuit. The register 109 can set the states of the control signals SL1 and SL2 through the data bus 50. For example, the register 109 has two storage circuits (e.g., 2 FFs) respectively capable of storing 1-bit of data. Respective storage circuits are provided for the selectors 105, 107. Suppose that if 0B is set as data in a storage circuit relative to the selector 105, the voltage level of the control signal SL1 is L level. Suppose that if 1B is set as data in a storage circuit relative to the selector 105, the voltage level of the control signal SL1 is H level. When the voltage level of the control signal SL1 is L level, for example, the selector 105 electrically connects the terminal 105b and the terminal 105c. When the voltage level of the control signal SL1 is H level, for example, the selector 105 electrically connects the terminal 105a and the terminal 105c.

Likewise, suppose that if 0B is set as data to a storage circuit relative to the selector 107, the voltage level of the control signal SL2 is L level. Suppose that if 1B is set as data to a storage circuit relative to the selector 107, the voltage level of the control signal SL2 is H level. When the voltage level of the control signal SL2 is L level, for example, the selector 107 electrically connects the terminal 107b and terminal 107c. When the voltage level of the control signal SL2 is H level, for example, the selector 107 electrically connects the terminal 107a and the terminal 107c.

The operation of the clock control circuit 200 having the construction as set forth above is now described. Suppose that in an initial state of the microcomputer 10, both the selector 105 and the selector 107 operate in response to the reference clock signal CK0. That is, suppose that 0B is stored in two storage circuits of the register 109. Accordingly, the voltage levels of both the control signals SL1 and SL2 become L level. Since the selector 105 selects the terminal 105b and the selector 107 selects the terminal 107b, both the operation clock signals CK1 and CK2 of the clock control circuit 200 correspond to the reference clock signal CK0.

When the frequency of the operation clock signal CK1 of the CPU 13 is changed, 8-bit data is first written in the register 205 by a write instruction relative to the register 205 in the microcomputer 10. This data is written in the register 205 through the data bus 50. The register 205 is controlled to write data in response to a signal generated upon issuance of a write instruction. The register 205 stores therein written data. Accordingly, the counter 203 outputs data stored in the register 205 to the counter 203 upon every falling of the divided clock signal FR to be outputted. As a result, a frequency of the divided clock signal FR outputted from the counter 203 is set.

Subsequently, the register 109 writes 1B in the storage circuit of the selector 105 in response to the write instruction relative to the register 109 in the microcomputer 10. As a result, the voltage level of the control signal SL1 becomes H level. The selector 105 switches the terminal electrically connected to the 105c to the terminal 105a in response to the voltage level of the control signal SL1. Accordingly, the operation clock signal CK1 outputted to the CPU 13 corresponds to the output signal FR of the counter 203.

When the frequency of the operation clock signal CK1 of the CPU 13 is returned to a frequency corresponding to that of the reference clock signal CK0, the register 109 may write 0B into the storage circuit of the selector 105 in response to the write instruction relative to the register 109.

When the frequency of the operation clock signal CK2 of the peripheral circuit 15 is changed, it is the same as the case where the frequency of the operation clock signal CK1 of the CPU 13 is changed. That is, 8-bit data is written in the register 215 in response to a write instruction relative to the register 215 in the microcomputer 10. This data is written in the register 215 through the data bus 50. The register 215 is controlled to write data in response to a signal generated upon issuance of the write instruction. The register 215 stores therein written data. Accordingly, the counter 213 outputs data stored in the register 215 to the counter 213 upon every falling of the divided clock signal FR to be outputted. As a result, the frequency of the divided clock signal FR outputted from the counter 213 is set.

Subsequently, the register 109 writes 1B in the storage circuit relative to the selector 215 in response to the write instruction relative to the register 109 in the microcomputer 10. Accordingly, the voltage level of the control signal SL2 becomes H level. The selector 107 switches the terminal electrically connected to the 107c to the terminal 107a in response to the voltage level of the control signal SL2. Accordingly, the operation clock signal CK2 outputted to the peripheral circuit 15 corresponds to the output signal FR of the counter 213.

When the frequency of the operation clock signal CK2 of the peripheral circuit 15 is returned to a frequency corresponding to that of the reference clock signal CK0, the register 109 may write 0B in the storage circuit of the selector 107 in response to a write instruction relative to the register 109.

As mentioned above, the clock control circuit 200 according to the second embodiment, like the first embodiment, can separately set and supply the frequency of the operation clock signal CK1 relative to the CPU 13 and the frequency of the operation clock signal CK2 relative to the peripheral circuit 15. Accordingly, it is possible to realize a low power consumption by the employment of the clock control circuit 200 of the invention without impairing functions of respective circuits constituting a semiconductor integrated circuit, such as a microcomputer, to which the clock control circuit 200 is employed.

Further, since the clock control circuit 200 can set the initial values of the counting operation of the counters 203, 213, the counters 203, 213 can generate divided clock signals having arbitrary frequencies such as ⅓ or ⅕ frequencies of the reference clock signal CK0. As a result, operation clock signal CK1 at the CPU 13 side and the operation clock signal CK2 at the peripheral circuit 15 side can respectively independently become the operation clock signals having the optimum frequencies. Accordingly, low power consumption can be efficiently realized.

Although the counters 203, 213 according to the second embodiment exemplify 8-bit counters comprising eight FFs, they are not limited thereto.

For example, the counters 203, 213 may comprise 9-bit or more counters composed of nine or may more FFs or comprise 7-bit or less counters composed of seven or fewer FFs. In this case, it is preferable for the number of bit of data stored in the registers 205, 215 to be the same as those of the corresponding counters 203, 213.

Figure 6:
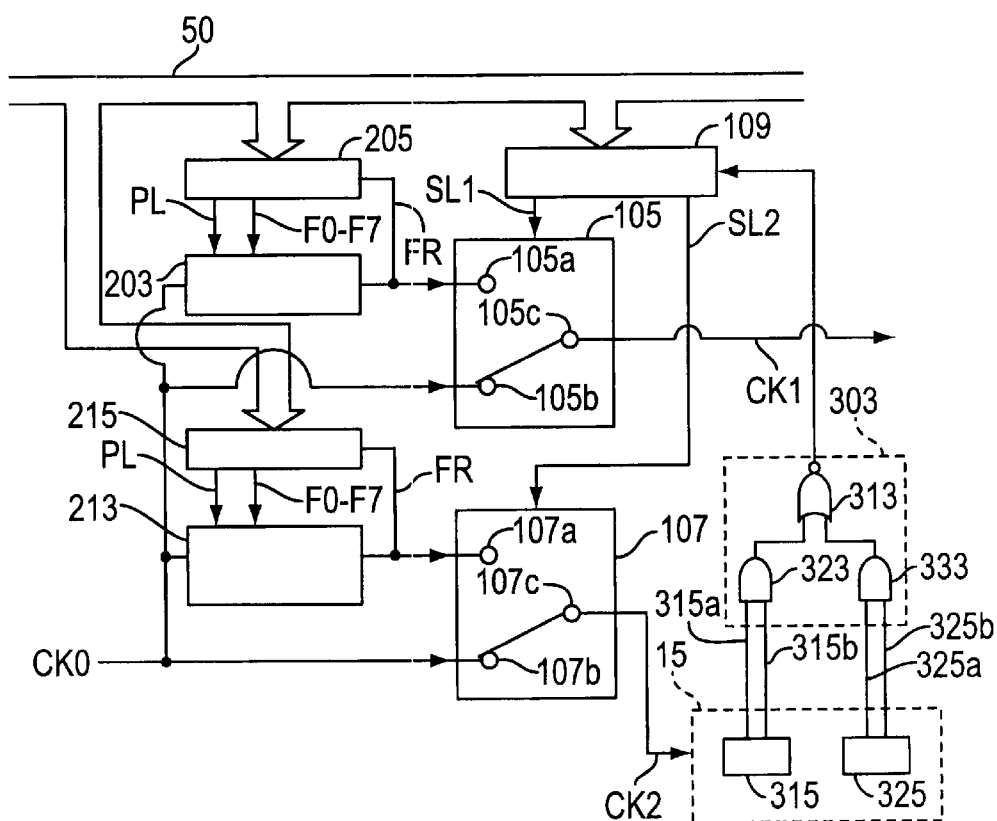
FIG. 6 is a view showing a modified example of the clock control circuit 200 according to the second embodiment of the invention.

The register 109 for controlling the selecting operation of the selectors 105, 107 of the clock control circuit 200 according to the second embodiment may be controllable by the peripheral circuit 15. Such examples are described hereinafter with the attached drawings. FIG. 6 shows a modified example of the clock control circuit 200 according to the second embodiment.

In FIG. 6, a logic circuit 303 serving as a switching circuit is added to the construction as shown in FIG. 5. The logic circuit 303 comprises a NOR gate 313, and two AND gates 323, 333.

An interrupt request signal 315a of a serial interface circuit 315 included in peripheral circuit 15 is inputted to one input terminal of the AND gate 323. A clock switching permission signal 315b of the serial interface circuit 315 is inputted to the other input terminal of the AND gate 323.

An interrupt request signal 325a of a timer circuit 325 included in peripheral circuit 15 is inputted to one input terminal of the AND gate 333. A clock switching permission signal 325b of the timer circuit 325 is inputted to the other input terminal of the AND gate 333.

The output terminals of the AND gates 323, 333 are respectively connected to the input terminals of the NOR gate 313. The output terminal of the NOR gate 313 is connected to the register 109.

The logic circuit 303 having the construction as set forth above allows the voltage level of the output signal of the NOR gate 313 serving as the output signal of the logic circuit 303 to be L level when the voltage levels of both the interrupt request signal 315a and the clock switching permission signal 315b of the serial interface circuit 315 are H level or when the voltage levels of both the interrupt request signal 325a and the clock switching permission signal 325b of the timer circuit 325b are H level.

Whereupon, if high speed processing (such as interruption processing) by the CPU 13 is needed in the serial interface circuit 315, the voltage level of the interrupt request signal 315a becomes H level. In a case other than the abovementioned case, the voltage level of the interrupt request signal 315a becomes L level. Likewise, if high speed processing (such as interruption processing) by the CPU 13 is needed in the timer circuit 325, the voltage level of the interrupt request signal 325a becomes H level. In a case other than the abovementioned case, the voltage level of the interrupt request signal 325a becomes L level.

In the case of permission of the high speed operation by CPU 13 when high speed operation by the CPU 13 is needed in the serial interface circuit 315, the voltage level of the clock switching permission signal 315b remains H level. In a case other than the abovementioned case, the voltage level of the clock switching permission signal 325b remains L level. Likewise, in the case of permission of high speed operation by the CPU 13 when high speed operation by the CPU 13 is needed in the timer circuit 325, the voltage level of the clock switching permission signal 325b remains H level. In a case other than the aforementioned case, the voltage level of the clock switching permission signal 325b remains L level.

In response to the L level of the voltage level of the output signal of the logic circuit 303, the register 109 renders the data stored in the storage circuit of the selector 105 0B. As a result, the terminal 105c is electrically connected to the terminal 105b in the selector 105. That is, the logic circuit 303 controls the switching of the state of the CPU 13 from a state where the CPU 13 operates at low speed (operates on the basis of the divided clock signal FR of the counter 203) to a state where the CPU 13 operates at high speed (operates on the basis of the reference clock signal CK0).

The operation of the clock control circuit having the logic circuit 303 which is shown in FIG. 6 and constructed as set forth above is now described. First, the voltage levels of the clock switching permission signals 315b, 325b are set in advance to H level so that the high speed operation of the CPU 13 is permissible when high speed operation by the CPU 13 is needed.

Thereafter, when an interrupt processing or the like occurs in the serial interface circuit 315 or the timer circuit 325 in a state where the CPU 13 operates at low speed (a state where the CPU 13 operates in response to the operation clock signal CK1 on the basis of the divided clock signal FR outputted from the counter 203), requiring the CPU 13 to operate at high speed, the voltage level of the interrupt request signal 315a or 325a is rendered H level. Accordingly, the voltage level of the output signal of the logic circuit 303 becomes L level so that the register 109 sets the data stored in the storage circuit of the selector 105 to 0B. As a result, the operation clock signal CK1 is outputted on the basis of the reference clock signal CK0 by way of the selector 105.

When the operation speed of the CPU 13 is intended to be reduced again, after the CPU 13 has completed interrupt processing at high speed, for example, it is sufficient that the register 109 executes a write instruction to the storage circuit of the selector 105 at the end of the interrupt processing routine. When 1B is written as data in the storage circuit of the selector 105 on the basis of the write instruction, the operation clock signal CK1 is outputted by way of the selector 105 on the basis of the divided clock signal FR which is the output of the counter 203.

Since the logic circuit 303 shown in FIG. 6 is provided as mentioned above, if high speed processing by the CPU 13 is needed in the peripheral circuit 15, the operation clock signal CK1 of the CPU 13 maybe based on the reference clock signal CK0.

Although the output signal of the logic circuit 303 responds to the serial interface circuit 315 and the timer circuit 325 in FIG. 6, it is not limited thereto. If high speed processing by the CPU 13 is needed in other peripheral circuits, for example, an arithmetic circuit or the like, it is sufficient that an interrupt request signal and a clock switching permission signal for controlling the output signal of the logic circuit 303 may be outputted from the arithmetic circuit. It is also possible to construct the output signal of the logic circuit 303 such that it can respond to any peripheral circuit.

Figure 7:
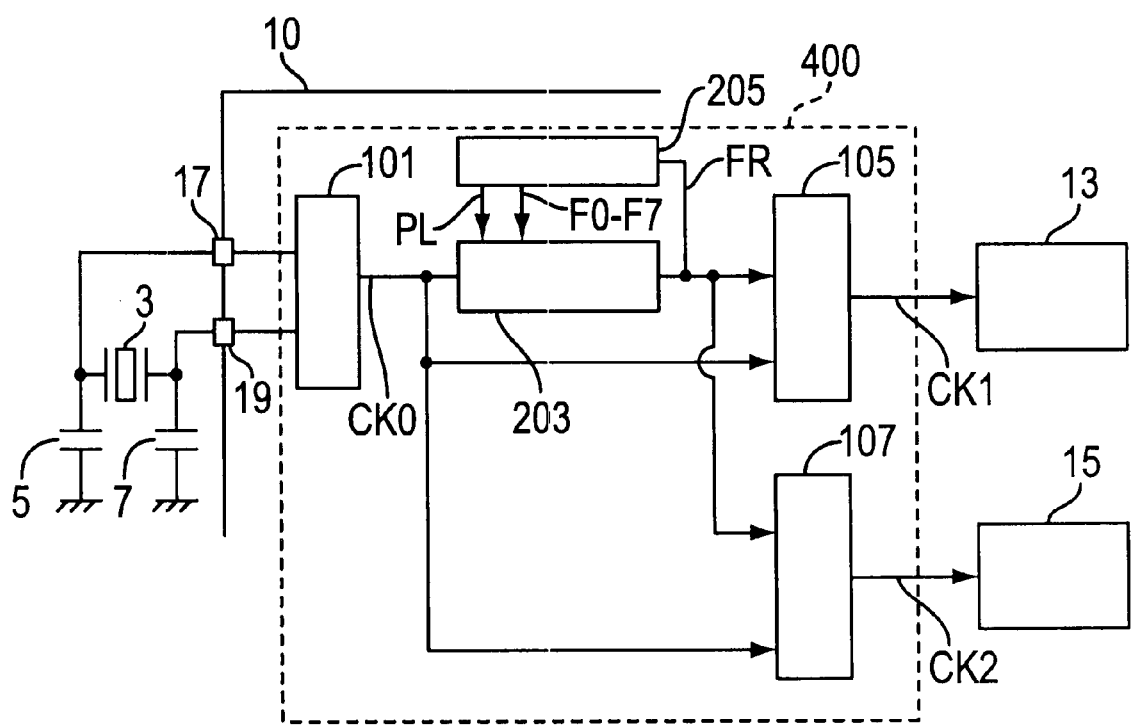
FIG. 7 is a block diagram of a clock control circuit 400 according to a third embodiment of the invention.

Next, a clock control circuit according to a third embodiment is described with reference to the attached drawing. FIG. 7 is a block diagram showing a clock control circuit 400 according to the third embodiment of the invention. In FIG. 7, components which are the same as those in FIG. 3 are depicted by the same reference numerals, and the explanation thereof is omitted to avoid the overlapping explanation.

The counter 213 and the register 215 in FIG. 3 are deleted from the clock control circuit 400 in FIG. 7. That is, in FIG. 7, the divided clock signal FR which is the output signal of the counter 203 is inputted to the selectors 105 and 107. Other components of the clock control circuit 400 in FIG. 7 are the same as those of the clock control circuit 200 in FIG. 3.

In FIG. 7, the selector 105 outputs the operation clock signal CK1 on the basis of either the reference clock signal CK0 or the divided clock signal FR which is the output signal of the counter 203. The selector 107 outputs the operation clock signal CK2 also on the basis of either the reference clock signal CK0 or the divided clock signal FR which is the output signal of the counter 203, like the selector 105.

The operation of the clock control circuit 400 is the same as that of the clock control circuit 200 in FIG. 3 except for the functions and operations of the counter 213 and the register 215.

In such a manner, the clock control circuit 400 according to the third embodiment can obtain the same effect as those of the first and second embodiments. Further, in the clock control circuit 400, the operation clock signal CK1 to be supplied to the CPU 13 at its low speed operation and the operation clock signal CK2 to be supplied to the peripheral circuit 15 at its low speed operation are set to be the same frequency. Accordingly, the clock control circuit 400 is effective in the case where operation clock signals having separate frequencies are not needed for the CPU 13 and the peripheral circuit 15 at their low speed operation.

The clock control circuit 400 can reduce a chip space or area of a semiconductor integrated circuit provided with a clock control circuit by the area where the counter 213 and the register 215 are provided compared with the clock control circuit 200 in the second embodiment. Further, the clock control circuit 400 can easily control the counter 213 and the register 215 by the omission or non-provision of the counter 213 and the register 215 compared with the clock control circuit 200 in the second embodiment.

Although the clock control circuit of the invention has been described above in detail, it is not limited to the first to third embodiments but it can be modified variously.

For example, the logic circuit 303 in FIG. 6 can also be applied to the clock control circuit 100 in the first embodiment and the clock control circuit 400 in the third embodiment. Further, one operation clock signal CK2 is supplied to the peripheral circuit 15 in the first to third embodiments, but it can be supplied to respective components constituting a peripheral circuit by providing additional plural counters and registers and a plurality of operation clock signals relative to the peripheral circuit 15.

Further, the selectors in the respective embodiments may be structured by a transistor gate of which is controlled by a control signal. The construction of the logic circuit 303 is not limited to that in FIG. 6 if it performs the same function.

Further, although the counters 103, 203, 213 are formed of FFs, they may be formed of other elements which are different from the FFs in a circuit configuration if they perform the same functions. Still further, the FFs in respective embodiments may operate at either the rising of signals to be inputted to the clock terminal thereof or at the falling of the same signals. Similar modifications can be applied to other components of the respective embodiments.

If the clock control circuit of the invention is mounted on a semiconductor integrated circuit employed by portable equipment which can be operated by a battery, electric charge in the battery is not consumed uselessly.

The constructions according to the respective embodiments show the clock control circuit having no complex control system and being simple in circuit configuration, thereby realizing the object of the invention.

What is claimed is:

1. A clock control circuit for supplying operation clock signals, each having a given period, to a central processing unit and to an internal circuit, comprising:

a divider for generating a divided clock signal by dividing a reference clock signal;

a first selector for selectively outputting either the reference clock signal or the divided clock signal as an operation clock signal to the central processing unit; and a second selector for selectively outputting either the reference clock signal or the divided clock signal as an operation clock signal to the internal circuit, wherein said divider comprises a first subdivider for generating a divided clock signal to be inputted to the first selector and the second subdivider for generating a divided clock signal to be inputted to the second selector.

2. The clock control circuit according to claim 1, wherein said divider generates a plurality of divided clock signals having different frequencies, and said first and second selectors output either the reference clock signal or one of the plurality of divided clock signals as the operation clock signals.

3. The clock control circuit according to claim 1, wherein said first subdivider comprises a first counter and includes a first setting circuit for setting an initial-value to the first counter in response to overflow of the first counter, and said second subdivider comprises a second counter and includes a second setting circuit for setting an initial-value to the second counter in response to overflow of the second counter.

4. The clock control circuit according to claim 1, further comprising a control circuit for controlling switching of outputs of the first and second selectors.

5. The clock control circuit according to claim 2, further comprising a control circuit for controlling switching of outputs of the first and second selectors.

6. The clock control circuit according to claim 3, further comprising a control circuit for controlling switching of outputs of the first and second selectors.

7. The clock control circuit according to claim 4, wherein switching of the output relative to the first selector is controlled in response to a signal outputted from the internal circuit.

8. The clock control circuit according to claim 5, wherein switching of the output of the first selector is controlled in response to a signal outputted from the internal circuit.

9. The clock control circuit according to claim 6, wherein switching of the output of the first selector is controlled in response to a signal outputted from the internal circuit.

10. A clock control circuit for supplying operation clock signals, each having a given period, to a central processing unit and to an internal circuit, comprising:

a divider for generating a divided clock signal by dividing a reference clock signal, wherein said divider comprises counters and includes setting circuits for setting an initial-value to each of said counters in response to overflow of that counter;

a first selector for selectively outputting either the reference clock signal or the divided clock signal as an operation clock signal to the central processing unit; and a second selector for selectively outputting either the reference clock signal or the divided clock signal as an operation clock signal to the internal circuit.

* * * * *

UNITED STATES PATENT AND TRADEMARK OFFICE
CERTIFICATE OF CORRECTION

PATENT NO. : 6,229,369 B1
APPLICATION NO. : 09/375807
DATED : May 8, 2001
INVENTOR(S) : Atsushi Yusa et al.

Page 1 of 1

It is certified that error appears in the above-identified patent and that said Letters Patent is hereby corrected as shown below:

IN CLAIM 1, COLUMN 16 LINES 34-50 SHOULD READ AS FOLLOWS:

A clock control circuit for supplying operation clock signals, each having a given period, to a central processing unit and to an internal circuit, comprising:
a divider for generating ~~a~~ first and second divided clock signals by dividing a reference clock signal;
a first selector for selectively outputting either the reference clock signal or the first divided clock signal as an operation clock signal to the central processing unit; and
a second selector for selectively outputting either the reference clock signal or the second divided clock signal as an operation clock signal to the internal circuit,
wherein said divider comprises a first subdivider for generating ~~a~~ the first divided clock signal to be inputted to the first selector and a ~~the~~ second subdivider for generating ~~a~~ the second divided clock signal to be inputted to the second selector.

IN CLAIM 2, COLUMN 16 LINES 51-56 SHOULD READ AS FOLLOWS:

The clock control circuit according to claim 1, wherein said divider generates a plurality of first and second divided clock signals having different frequencies, and said first and second selectors output either the reference clock signal or one of the plurality of first and second divided clock signals as the operation clock signals.

Signed and Sealed this

Fourth Day of September, 2007

JON W. DUDAS
*Director of the United States Patent and Trademark Office*